United States Patent [19]

Sprague

[11] Patent Number: 4,978,456
[45] Date of Patent: Dec. 18, 1990

[54] METHOD FOR INHIBITING SCALE AND CORROSION IN WATER SYSTEMS

[75] Inventor: Sherman J. Sprague, Twinsburg, Ohio

[73] Assignee: The Mogul Corporation, Chagrin Falls, Ohio

[21] Appl. No.: 383,725

[22] Filed: Jul. 24, 1989

Related U.S. Application Data

[63] Continuation-in-part of Ser. No. 205,117, Jun. 10, 1988.

[51] Int. Cl.$^5$ .............................................. C02F 5/14
[52] U.S. Cl. ................................... 210/699; 210/701; 252/180
[58] Field of Search ................................ 210/698–701; 252/180, 181

[56] References Cited

U.S. PATENT DOCUMENTS

| | | | |
|---|---|---|---|
| 3,505,238 | 4/1970 | Liddell | 252/180 |
| 3,666,664 | 5/1972 | Lorenc et al. | 210/700 |
| 3,959,167 | 5/1976 | Hwa et al. | 210/701 |
| 3,992,318 | 11/1976 | Gaupp et al. | 252/181 |
| 4,026,815 | 5/1977 | Kallfass et al. | 252/180 |
| 4,048,066 | 9/1977 | Cuisia et al. | 210/701 |
| 4,164,574 | 8/1979 | Quinlan | 252/180 |
| 4,239,648 | 12/1980 | Marshall et al. | 422/15 |
| 4,255,259 | 3/1981 | Hwa et al. | 210/699 |
| 4,389,324 | 6/1983 | Keller | 210/701 |
| 4,556,493 | 12/1985 | Cuisia | 210/699 |
| 4,556,943 | 12/1985 | Cuisia | 252/180 |
| 4,576,722 | 3/1986 | Gaylor et al. | 210/701 |
| 4,663,053 | 5/1987 | Geiger | 210/699 |
| 4,713,195 | 12/1987 | Schneider | 252/180 |

Primary Examiner—Peter Hruskoci
Attorney, Agent, or Firm—Pearne, Gordon, McCoy & Granger

[57] ABSTRACT

This invention is directed to the treatment of aqueous systems, and specifically to the inhibition and removal of scale and solid deposits in industrial water systems. The invention comprises the use of less than a stoichiometric amount of an inhibitor composition comprising at least one acrylic polymer, at least one water-soluble polymer derived from maleic acid or its anhydride, water-soluble organic phosphonates, and at least one water-soluble chelating agent. This inhibitor composition is added to the water in the systems in amounts ranging from about 0.01 to 600 parts of the inhibitor composition per million parts by weight of the water.

4 Claims, No Drawings

METHOD FOR INHIBITING SCALE AND CORROSION IN WATER SYSTEMS

CROSS REFERENCE TO RELATED APPLICATION

This application is a continuation-in-part of copending application Ser. No. 07/205,117, filed June 10, 1988, for a Composition And Method For Inhibiting Scale In Water Systems.

This invention is directed to the treatment of aqueous systems, and more specifically to the inhibition and removal of scale and solid deposits in various industrial heating and cooling systems. This invention relates to a novel composition and a method for treating aqueous systems to prevent the accumulation of mineral scale and corrosion which comprises adding to the water an amount less than the stoichiometric amount, based on the weight of the water, of a water-soluble composition comprising an acrylic polymer, i.e., derived from acrylic acid having an average molecular weight ranging up to 50,000; a small but effective amount of a polymer derived from maleic acid or the anhydride of maleic acid having an average molecular weight ranging up to about 5,000; an effective but small amount of at least one water soluble organic phosphonate; and at east one water-soluble organic chelant.

The water used in industrial systems such as in steam generating boilers, hot water heaters, heat exchangers, cooling towers, pipelines, gas scrubbing systems and related equipment accumulate various impurities derived from the water. These impurities generally include the alkaline earth cations, such as calcium, barium and magnesium, and some bicarbonates and carbonates, sulphates, phosphates, silicates and the like. The most common impurities in industrial water are the water-hardening metal ions including calcium, magnesium and the carbonate ions. In addition to precipitating as carbonates, calcium and magnesium, as well as the other metals such as iron or copper, react with the sulphates or phosphates to form the respective insoluble complex salts. These reaction products accumulate on the surfaces of the system forming scale and sludge, which substantially reduces the heat transfer efficiency by settling in the systems and by acting as insulation on the heat-transfer surfaces. Moreover, in addition to interfering with the fluid flow and heat transfer, corrosion of the metal surfaces is promoted, since the corrosion inhibitors added to the water are not able to contact the surfaces to provide protection against the corrosive reagents. Further, scale deposits harbor bacteria, the removal of which is expensive due to delays in shutdown. etc.

In high-temperature, steam-generating boilers, hard waters are especially susceptible to the formation of scale, causing severe accumulations which result in overheating and, in some instances, rupturing of the boilers. Conditions which influence the formation of scale include insolubility of the various inorganic materials such as calcium carbonate and calcium sulphate, which have a tendency to become supersaturated as the water evaporates. This scale build-up may be controlled by treating the water to remove the scale-forming constituents before using the water in the system. However, the use of an internal treatment by adding inhibitors to the water is more economical and requires no capital expenditures as required in pre-treating the water.

Accordingly, this invention relies on the use of a specific composition comprising a combination of water-soluble acrylic polymers and polymers derived from maleic acid or the anhydride thereof, together with a combination of water-soluble organic phosphonates and water-soluble chelating agents. This scale and corrosion-inhibiting composition is used in small but effective amounts, i.e., less than stoichiometric amounts or substoichiometric amounts to react with the metallic ions in the water to prevent the adherence of mineral scale to the surfaces of the heat transfer equipment.

BACKGROUND OF THE INVENTION

Combinations of organic inhibitors, such as organic phosphonic acids together with polymeric acrylics, have been used in various aqueous systems. The addition of chelating agents to these systems, however, e.g., steam generators, to prevent the deposition of metallic ions has been based on the concentrations of these metal ions in the water. Thus, these prior art methods require precise control of the amount of chemical added to the system, since the chelant, for example, if added in less than a stoichiometric amount, leads to the deposition of metal on the surface, while any overfeeding has a tendency to cause corrosion due to the by-products generated in the form of insoluble salts.

Attempts to prevent or control mineral deposits in aqueous systems, i.e., steam generating systems, includes the use of organic phosphonates in combination with various polymeric dispersents. A problem with this combination of additives, however, is that a large volume of suspended solids is formed by the precipitating reaction products, which require large blowdowns, and therefore reduce the efficiency of the system.

In accordance with this invention, the chemical feed problem normally associated with the fluctuation of the quality of the feed water is avoided by preventing an accumulation of excess chelating agent. This is accomplished by utilizing a combination of a polymer derived from acrylic acid with polymers derived from maleic acid or its anhydride and at least one organic phosphonate. These polymers together with the phosphonate react with the feed-water minerals when the chelant is deficient. It was found that, by utilizing a combination of the two polymers with an organic phosphonate and a chelating agent, there was not only a reduction in the amount of suspended solids, but also a decrease in the deposition of the various mineral salts, resulting in an increase in efficiency and a minimum amount of maintenance and repair.

There have been various attempts to overcome the problems relating to corrosion and mineral salt deposition in aqueous systems, some of which have been solved by the use of chelating agents in combination with various phosphonates as disclosed in U.S. Pat. No. 3,666,664. Here, water-soluble anionic polymers are used in combination with a chelating agent and phosphonates. Similarly, U.S. Pat. 3,959,167 discloses a composition for inhibiting the accumulation of scale on heating surfaces in an aqueous system which comprises an acrylic polymer together with a chelant and phosphonic acid. Further, U.S. Pat. No. 4,255,259 discloses a composition for inhibiting scale in aqueous systems comprising a copolymer of styrene-sulphonic acid with maleic anhydride and a water-soluble phosphonic acid or salt thereof. Similarly, U.S. Pat. No. 3,706,717 discloses that scale deposits can be controlled or prevented in aqueous systems by the addition of acrylic acid polymers in combination with corrosion inhibiting sequestrants. The use of acrylic acid polymers with phosphorous acid products have been suggested for treating aqueous systems by U.S. Pat. Nos. 4,239,648 and 4,159,946.

SUMMARY OF THE INVENTION

To avoid many of the problems associated with industrial aqueous systems such as steam-generating boilers, hot water heaters, heat exchangers, and the like, it has been found that the unique composition of this invention may be used in small but effective amounts, i.e., less than a stoichiometric amount, to effectively inhibit the accumulation of mineral scale and prevent corrosion that normally takes place in aqueous systems. The water-soluble composition of this invention comprises a combination or mixture of from about 0.5 to 1.5 parts by weight of at least one polymer derived from acrylic acid, including the acrylic and methacrylic acid homopolymers copolymers, and terpolymers having average molecular weights ranging up to about 50,000, e.g., from about 100 to 5000; from about 0.5 to 1.5 parts by weight of at least one water-soluble polymer derived from maleic acid or the anhydride of maleic acid including the homopolymers, copolymers and terpolymers derived from maleic acid having average molecular weights ranging up to about 5,000, e.g., from about 500 to 1000; from about 0.5 to 1.5 parts by weight of at least one water-soluble organic phosphonate, and from about 0.1 to 0.5 parts by weight of at least one water-soluble organic chelating agent.

This composition can be added to the aqueous system to prevent the accumulation of scale, sludge and corrosion by adding to the water a substoichiometric amount of the composition comprising the acrylic polymer, the maleic acid polymer, the organo phosphonate and the chelating agent in the specific proportions disclosed herein. Specifically, the composition of this invention is added to the aqueous systems to prevent the accumulation of scale in an amount less than stoichiometric amounts ranging from about 0.01 to 600 parts by weight per million parts by weight of the water, and preferably the inhibitor composition is added to the aqueous systems in an amount ranging from about 1.0 to about 200 parts by weight of said composition, i.e., the acrylic polymer, the maleic acid polymer, the phosphonate and the chelant, for every million parts by weight of water in the system.

DETAILED DESCRIPTION

More specifically, this invention relates to a novel composition for inhibiting scale and corrosion of metal and to prevent the deposition of mineral scale in aqueous systems, such as steam boilers, cooling towers, and various other industrial aqueous systems, by adding to the water an inhibitor composition which comprises parts based on a million parts by weight of the water, from about:

(a) 0.5 to 1.5, and preferably approximately 1.0 part by weight of at least one acrylic polymer derived from acrylic acid having average molecular weights ranging up to about 50,000 and preferably average molecular weights ranging from about 1,000 to 5,000. and (b) from about 0.5 to 1.5 parts by weight, and preferably approximately 1.0 part by weight of at least one water-soluble polymer derived from maleic acid or maleic acid anhydride having average molecular weights ranging up to about 5,000 and preferably average molecular weights ranging from about 500 to 1,000, and (c) from about 0.5 to 1.5. and preferably 1.0 part by weight of at least one water-soluble organic phosphonate, and from about 0.1 to 0.5 and preferably about 0.3 parts by weight of at least one water-soluble organic chelating agent.

The composition is used to treat the system to prevent the accumulation of scale and corrosion by adding to the water in the system a substoichiometric amount, i.e., an amount less than the stoichiometric amount needed to react with the scale-forming anions and cations, preferably, the water-soluble composition is added to the aqueous systems in an amount less than the stoichiometric amount ranging from about 0.01 to 600, and more preferably in amounts ranging from 1.0 to 200 parts by weight of the water-soluble composition per million parts by weight of water being treated. The precipitation of the scale-forming compounds can be prevented by inactivating their cations with the composition of this invention such that the solubility of the compounds does not exceed the point where they deposit on the metal surfaces.

To accomplish these results, it was found that certain organo phosphonates in combination with the polymers and chelant were effective in threshold or substoichiometric amounts to sequester the scale-forming ions. For purposes of this invention, the phosphonates are used in the composition in amounts or at a ratio ranging from about 0.5 to 1.5, and preferably 1.0 part by weight for every 0.1 to 0.5 part by weight and preferably 0.3 parts by weight of the chelant. More specifically, these phosphonates may be characterized by formulae I, II, and III:

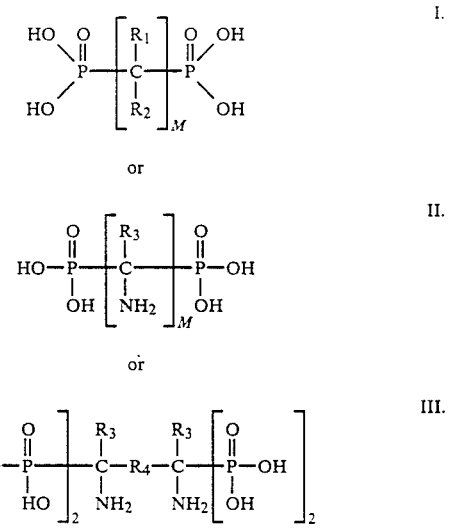

wherein M is an integer from 1 to 10, $R_1$ is hydrogen, or an alkyl group having from 1 to 4 carbons, and $R_2$ is hydroxyl, hydrogen, or an alkyl group having from 1 to 4 carbons, $R_3$ is an alkyl group having 1 to 8 carbons, benzyl or phenyl, $R_4$ is an aliphatic radical having from 1 to 8 carbons, and includes the water-soluble salts, esters and mixtures thereof.

The preferred organic phosphonic acid compounds of this invention are the alkylene diphosphonic acids as taught, for example, by U.S. Pat. No 3,303,139, the disclosure of which is incorporated herein by reference.

Specific acids include methylenediphosphonie acid; ethylidenediphosphonic acid; isopropylidenediphosphonic acid; 1-hydroxy, ethylidenediphosphonic acid; hexamethylenediphosphonic acid; trimethylenediphosphonic acid; decamethylenediphosphonic acid; 1-hydroxy, propylidenediphosphonic acid; 1,6-dihydroxy, 1,6 dimethyl, hexamethylenediphosphonic acid; 1,4-dihydroxyl, 1,4-diethyl, tetramethylenediphosphonic acid; 1,3-dihydroxy 1,3-dipropyl, trimethylenediphosphonic acid; 1,4-dibutyl, tetramethylenediphosphonic acid; dihydroxy, diethyl, ethylenediphosphonic acid; 4-hydroxy, 6-ethyl, hexamethylenediphosphonic acid; 1-hydroxy, butylidenediphosphonic acid; butylidenediphosphonic acid; 1-aminoethane-1, 1-diphosphonic acid; 1-aminopropane-1, 1-diphosphonic acid; 1-aminobenzyl-1, 1-diphosphonic acid; 1,6diaminohexane-1, 1,6,6-tetraphosphonic acid; 1–10 aminoethane-1, 1-diphosphonic acid monoethyl ester, and 1-amino-2-phenylethane-1, 1-diphosphonic acid.

In addition, the water-soluble salts of these acids, such as the alkali metal, alkaline earth metal, ammonium, amine and lower alkanol amine salts, are useful. The esters of these acids with aliphatic alcohols having from 1 to 4 carbons, or mixtures of the above acids, salts or esters, can be used. Mixtures of any of the phosphonic acid compounds described herein are contemplated to be within the scope of this invention. Also included are the compounds disclosed in U.S. Pat. No., 3.214,454 and 3,297,578. Other useful compounds include the phosphonic acid derivatives having the following formula:

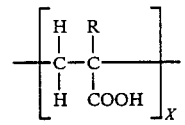

where $R_5$ is independently selected from the group consisting of an alkyl group up to four carbon atoms and phosphonate groups, and $R_6$ is selected from the group consisting of alkyl groups having up to 4 carbon atoms, when $R_5$ is a phosphonate group, and

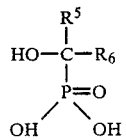

where n is 0 to 6, when $R_5$ is an alkyl group and the water-soluble salts thereof.

For purposes of this invention, the specific phosphonic acid compounds include, for example, 1-hydroxy, ethylidene diphosphonic acid; 1-hydroxy, propylidene diphosphonic acid; 1,6-dihydroxy-1, 6-dimethyl, hexamethylene diphosphonic acid (i.e., tetramethylene bis (methyl methanol phosphonic acid); 1,4-dihydroxy-1, 4-diethyl, tetramethylene diphosphonic acid (i.e., dimethylene bis-(ethylmethanol phosphonic acid); 1,3-dihydroxy-1, 3-dipropyl trimethylene diphosphonic acid (i.e., methylene bis (propylmethanol phosphonic acid); bis(ethylemethanol phosphonic acid) and the alkali metal salts.

The water-soluble composition of this invention utilizes an acrylic polymer including a variety of polycarboxylates or water-soluble polar polymers such as the acrylic acid polymers used as conditioners in industrial water systems. More specifically, a small quantity of the acrylic polymer improves the fluidity of the precipitated sludge by forming frangible precipitates that are easily removed instead of the hard or dense crystals that form scale. The dispersed solid particles are suspended by the acrylic polymers and carried through the system by the flow of the water or by blowdown.

These water-soluble acrylic polymers include, for example, polymers having repeated groups of the formula:

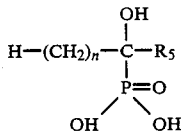

wherein X has the value ranging from 5 to 800, R is hydrogen or a methyl group and the water-soluble salts, e.g., alkali metal salts or esters of the acrylic polymers, for example, ester groups having 1–4 carbon atoms.

The acrylic polymers for use in this invention include the acrylic or methacrylic acids and the derivatives, for example, acrylic acid, the alkali metal and ammonium salts of acrylic acid, esters of acrylic acid with lower ($C_1$ to $C_4$) alkanols, methacrylic acid, esters of methacrylic acid with lower ($C_1$ to $C_4$) alkanols, and copolymers of these acrylic acids and derivatives with each other. Specifically, these polymers include, for example, polyacrylic acid, ammonium polyacrylate, sodium polyacrylate, ammonium polymethacrylate, dimethylaminoethyl polymethacrylate, methacrylic acid-dimethylaminoethyl methacrylate copolymer, acrylic acid-methacrylic acid copolymer, and the like. The preferred polymers are polyacrylic acid, polymethacrylic acid, and the water-soluble salts of these polymers having an average molecular weight ranging from about 500 to 50,000.

Other examples of polymers of acrylic acid and methacrylic acid include the water-soluble homopolymers of acrylic acid; homopolymers of methacrylic acid; the copolymer of acrylic acid and methacrylic acid; a copolymer of acrylic acid and/or methacrylic acid with other polymerizable ethylenically unsaturated monomers. e.g., crotonic acid, maleic acid or its anhydride, vinyl sulfonic acid, vinyl phosphonic acid, vinyl acetate, ethyl vinyl ether, acrylamide, ethyl acrylate and ethyl methacrylate and the like.

In addition to the acrylic polymers, it was found that polymers of maleic acid or its anhydride or the copolymers of maleic acid and its anhydride are effective water conditioners particularly useful in treating the feedwater to boilers, evaporators and the like. Particularly useful maleic polymers include the water-soluble low molecular weight linear copolymers of maleic anhydride copolymerized with ethylenically unsaturated compounds such as ethylene, propylene, butylene, vinyl acetate, acrylonitrile, acrylic acid, methyl acrylate, ethyl acrylate, methyl vinyl ether, sodium vinyl sulfonate, styrene and the like. These copolymers can be characterized by the formula:

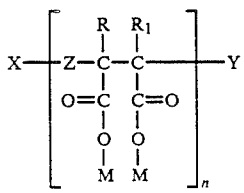

wherein R and $R_1$ are hydrogen or an organic radical having from 1 to 8 carbon atoms wherein R and $R_1$ are the same or different, Z is an organic radical having 1 to 8 carbon atoms, M is hydrogen, ammonium or an alkali metal; n is an integer, and X and Y are end groups of hydrogen or a short chain organic group of 1 to 4 carbons.

Other water-soluble anionic polymers are the maleic anhydride and styrene copolymers as set forth in U.S. Pat No. 2,723.956 and U.S. Pat. No. 3,549 538. Additional maleic anhydride copolymers for water treatment purposes are disclosed in U.S. Pat. Nos. 4,255,259 and 4,306,991; the disclosures of which are incorporated herein.

The acrylic polymers and the polymers derived from maleic acid or its anhydride are present in the composition in ratios ranging from about 0.5 to 1.5 parts by weight and preferably in a ratio of about 1.0 part by weight for every 0.1 to 0.5 and preferably 0.3 parts by weight of chelant. In other words, the acrylic polymer, maleic acid polymer and organic phosphonate are present in the composition in a preferred ratio of about 1.0 part by weight for each of the two different polymers and 1.0 part by weight for the phosphonate for every 0.3 parts by weight of the chelant.

Chelating agents are considered an aggressive way of treating water systems in that the chelant can cause serious corrosion problems if used in excessive amounts, but are, however, useful as preventing the deposits of mineral scale. The preferred chelants for purpose of this invention include the tetrasodium salts of ethylenediamine tetracetic acid (EDTA) and the trisodium salt of nitrilotriactic acid (NTA). Various mixtures of the chelants i.e. EDTA and NTA may be used, and preferably include a 50/50 mixture.

When used in combination with the acrylic and maleic acid polymers and with one or more phosphonates, the chelants are generally used with these polymers and the phosphonate under "starvation conditions," i.e. substantially no free amount of chelant remains in the water based on the level of hardness i.e. concentration of metal ions in the feed water. A less than or substoichiometric amount of the chelant is fed, i.e., only an amount equal to about 1.0 to 95% of the hardness, to the system in combination with the phosphonates and the two polymers. Any water hardness that does not react with the chelant, i.e., excess hardness, is allowed to precipitate and is dispersed with the polymers, e.g., the polyacrylate and the polymaleic acids.

In accordance with this invention, less than a stoichiometric amount or a substoichiometric amount of the inhibitor composition means the total mole ratios of inhibitor equivalent to the mole ratio of the scale forming cations. The use of substoictiometric amounts is generally referred to as the threshold treatment of water, as particularly pointed out in U.S. Pat. No. 3,336,221, the disclosure of which is incorporated herein by reference.

The following illustrate that the combination of the polyacrylate and polymers of maleic acid or its derivatives together with an organo phosphonate and a chelant improve scale inhibition in aqueous systems.

EXMAPLE I

| INHIBITOR | RATIOS PARTS BY WEIGHT |
| --- | --- |
| 1-hydroxyethylidene-1, 1-diphosphonic acid | 0.5 to 1.5 |
| Water-soluble homopolymer of maleic acid | 0.5 to 1.5 |
| Water-soluble polyacrylic acid | 0.5 to 1.5 |
| Tetrasodium salt of ethylenediaminetetracetic acid | 0.1 to 0.5 |

EXAMPLE II

| INHIBITOR | RATIOS PARTS BY WEIGHT |
| --- | --- |
| 1-hydroxyethylidene, 1-diphosphonic acid | 1.0 |
| Water-soluble polyacrylic acid | 1.0 |
| Water-soluble polymaleic acid | 1.0 |
| Ethylenediamenetetracetic acid tetrasodium salt | 0.33 |

TABLE I

| INHIBITOR COMPOSITION | A | B | C | D | E | BASELINE |
| --- | --- | --- | --- | --- | --- | --- |
| 1-hydroxyethylidene; 1-diphosphonic acid | 1.0 | 1.0 | 1.0 | 1.0 | 0 | None |
| Water-soluble polyacrylic acid | 1.0 | 1.0 | 1.0 | 0 | 1.0 | None |
| Water-soluble polymaleic acid | 1.0 | 1.0 | 0 | 1.0 | 1.0 | None |
| Ethylenediamine tetracetic acid tetrasodium salt | 0.36 | 0 | 0.34 | 0.48 | 0.35 | None |
| PERCENT MINERAL DEPOSITS | | | | | | |
| Calcium | 9.0 | 13.9 | 35.6 | 28 | 39.1 | 45.7 |
| Magnesium | 14.3 | 20.0 | 29.0 | 40 | 22.1 | 31.6 |
| Silica | 3.4 | 4.7 | 9.7 | 13.8 | 5.5 | 8.5 |

The data in Table I illustrates (Examples A–E) that when all four (4) inhibitors of the composition were used in their ratios of about 1:1:1:0.36, the percentage of deposits in the system was substantially reduced as shown in Example A when compared to the baseline. Moreover, the amount of the deposit was substantially lower when comparing the data of Example A with Examples B through E wherein one of the four (4) components of the composition was omitted. Thus, it was found that the unique combination of the phosphonic acid with the acrylic polymer and the maleic acid polymer synergisically functioned with the chelant in sub-stoichiometric amounts to substantially improve water treatment with respect to corrosion and scale inhibition. While only three of the inhibitors of the composition were better than the baseline (as shown in Examples B, C, D, & E), the use of a combination of all four inhibitors was an improvement over not only the baseline but also the combination of only three (3) as shown by comparing Example A with Examples B, C, D, and E.

The data in Table I illustrates also the effectiveness of using the inhibitor composition of this invention in the ratio of approximately three (3.0) parts by weight of each of the organo phosphonates, the polyacrylic acid derivatives and the polymaleic acid derivatives with only about 1.0 part by weight of the chelant, e.g., an ethylenediamine tetraacetic acid tetrasodium salt.

As illustrated by the data in Table I, the addition of less than a stoichiometric amount of the chelant together with both polymers and the phosphonate enhances the effectiveness of the composition to inhibit the formation of mineral deposits in aqueous systems. The inhibitor composition of this invention keeps the scale-forming constituents suspended so the metal compounds or scale-forming materials will not adhere to the heat transfer surfaces, thereby yielding a cleaner heat transfer unit and more efficient use of energy. Moreover, it was found that in the event the chelant is present in an excessive amount, the excess will not promote corrosion but will prevent the inorganic ions, such as calcium, magnesium and other mineral salts, from depositing on the metal surfaces at temperatures as high as 212° F. Previously, the addition of boiling water inhibitors was calculated on the use of exact or stoichiometric amounts of chelant together with polymers, phosphonates, etc. These prior procedures therefore required precise control of the chemical addition. For example, if the chelant were underfed, the metal ions would deposit on the surface, and with an overfeed the metal surface has a tendency to corrode and form insoluble products, e.g., iron salts, etc. that would redeposit in the system, and impairs the efficiency of heat transfer.

This invention, however, is designed to prevent the accumulation of an excessive amount of the chelant by using a combination of the acrylic and maleic polymers with the phosphonate which react with the feed-water minerals when added to the system in less than substoichiometric amounts. The inhibitor composition of this invention may be used as a dry powder and permitted to dissolve during the addition to the system. Generally, the inhibitor composition is solublized or used as an aqueous solution. These solutions may contain from about 0.01 to 75% by weight of the inhibitors, but preferably from abort 1 to 50% by weight. These solutions can be prepared by adding each of the four inhibitors in any order to water at ambient temperatures. The amount of the inhibitor composition added to the aqueous system is less than stoichiometric but is sufficient to inhibit scale and sludge formation depending on the quality of the water being treated. Generally, however, depending on the quality and source of the water, e.g., hardness, the inhibitor of this invention is added to the system in amounts ranging from about 0.01 to about 600 parts per million (ppm) and preferably from about 1 to about 200 ppm of water in the system.

In addition, the inhibitor composition of this invention may be used in combination with other known additives customarily employed in water treatment including, for example, such compounds as corrosion inhibitors e.g. the triazoles, biocides, and various other water-treating additives. The inhibitor is generally added to the makeup or feed water as the water enters the system and typically by means of a calibrated injector which delivers a pre-determined amount periodically or continuously to the water system.

While this invention has been described by a number of specific embodiments, it is obvious there are variations and modifications which can be made without departing from the spirit and scope of the invention as particularly set forth in the appended claims.

What is claimed is:

1. A method of treating aqueous systems to inhibit calcium, magnesium and silica mineral deposits comprising adding to the water in the system less than a stoichiometric amount of an inhibiting composition comprising a mixture of about
   (a) 0.5 to 1.5 parts by weight of at least one acrylic polymer having an average molecular weight of from about 100 to about 5,000;
   (b) 0.5 to 1.5 parts by weight of at least one water-soluble polymer derived from maleic acid or its anhydride having an average molecular weight of from about 500 to about 1,000;
   (c) 0.5 to 1.5 parts by weight of at least one water-soluble organic phosphonate which is a salt of 1, hydroxyethylidene-1,1-di-phosphonic acid; and
   (d) 0.1 to 0.5 parts by weight of at least one water-soluble organic chelant which is a salt of ethylenediamine tetracetic acid,
the ratios of said acrylic polymer, maleic acid or its anhydride polymer, and water-soluble organic phosphonate to said chelant being 1:1:1 to 0.3.

2. The method of claim 1 wherein less than a stoichiometric amount of the inhibiting composition ranges from about 0.01 to about 600 parts by weight per million parts by weight of water in the system.

3. The method of claim 1 wherein the acrylic polymer is a polymer of acrylic acid.

4. The method of claim 3 wherein the polymer derived from maleic acid or its anhydride is a polymer derived from maleic anhydride and an unsaturated monomer.

* * * * *